United States Patent [19]

Yoshimura et al.

[11] Patent Number: 4,568,186

[45] Date of Patent: Feb. 4, 1986

[54] OPERATOR SELECTABLE MULTIPLE MODE SPECTROPHOTOMETER

[75] Inventors: Manabu Yoshimura; Tokuji Shibahara; Shigeki Kobayashi, all of Kyoto, Japan

[73] Assignee: Omron Tateisi Electronics Co., Kyoto, Japan

[21] Appl. No.: 933,574

[22] Filed: Aug. 14, 1978

[30] Foreign Application Priority Data

Aug. 19, 1977 [JP] Japan .................................. 52-99306

[51] Int. Cl.⁴ ........................... G01J 3/06; G01J 3/34; G01J 3/42
[52] U.S. Cl. .................................... 356/308; 356/319; 356/328; 364/418
[58] Field of Search ................ 356/308, 309, 325–330, 356/418, 419, 319; 364/498, 526

[56] References Cited

U.S. PATENT DOCUMENTS

| | | | |
|---|---|---|---|
| 3,385,160 | 5/1968 | Dawson et al. | 356/328 |
| 3,874,799 | 4/1975 | Isaacs et al. | 356/323 |
| 3,972,617 | 8/1976 | Shibato et al. | 356/319 |
| 3,973,849 | 8/1976 | Jackson et al. | 356/308 |
| 4,093,991 | 6/1978 | Christie, Jr. et al. | 356/326 |

*Primary Examiner*—Vincent P. McGraw
*Attorney, Agent, or Firm*—Wegner & Bretschneider

[57] ABSTRACT

A spectrophotometer is provided for measuring and displaying an absorbance change as a function of time, a wavelength spectra, or an absorbance difference as a function of time between two specific wavelengths, which comprises a wavelength scanner for scanning through a plurality of wavelengths in a scan range, a wavelength reader for generating wavelength signals corresponding to the scanned wavelengths, photodetectors for detecting the light intensity of a scanned wavelength, an A-D converter for converting analog signals of a scanned wavelength to digital signals, a storage device for storing data generated from the A-D converter corresponding to each wavelength, an operational circuit for processing stored data, and display devices for displaying the processed data.

23 Claims, 7 Drawing Figures

| 48 a | 48 b | 48 c | 48 d | PHOTO DETECTOR / COUNTER |
|---|---|---|---|---|
| ✶ | ↑ | H | ✶ | 1 UP |
| ✶ | ↓ | H | ✶ | 1 DOWN |
| ↑ | ✶ | L | ✶ | 1 UP |
| ↓ | ✶ | L | ✶ | 1 DOWN |
| ✶ | ✶ | ✶ | H | SET |

| SCAN CYCLE \ WAVE LENGTH | L1 | L2 | L3 | ----- | Lm |
|---|---|---|---|---|---|
| X1 | D(L1,X1) | D(L2,X1) | D(L3,X1) | | D(Lm,X1) |
| X2 | D(L1,X2) | D(L2,X2) | D(L3,X2) | | D(Lm,X2) |
| X3 | D(L1,X3) | D(L2,X3) | D(L3,X3) | | D(Lm,X3) |
| ⋮ | ⋮ | ⋮ | ⋮ | | ⋮ |
| Xn | D(L1,Xn) | D(L2,Xn) | D(L3,Xn) | | D(Lm,Xn) |

OPERATOR SELECTABLE MULTIPLE MODE SPECTROPHOTOMETER

BRIEF SUMMARY OF THE INVENTION

The present invention relates to a spectrophotometer for use in spectroscopic measurement and more particularly to a device for analyzing an intracellular metabolic reaction of organs.

In the medical and biological field, spectroscopic measurement is inevitable for clinical examination and fundamental research. One of prior techniques is to determine the amount of principles contained in blood by measuring light absorption of a specimen thereof or to monitor movement of cellular particles by measuring scattered light therefrom. Recently developed fiber optics has enabled direct observation of metabolic alterations in living tissues by directly applying light thereto. For observing metabolism in living organs, it is necessary to process spectroscopic measurements in various modes; e.g., obtaining absorption spectra of the tissue; following changes in absorbance of predetermined wavelengths as a function of time; following changes in the difference between the absorbances of two specific wavelengths as a function of time which is known as a dual wavelength measurement; and obtaining difference spectra between absolute absorption spectra in one status of an organ and absolute absorption spectra in another status. Accordingly, a multipurpose spectrophotometer which enables desired measurement of the above various modes is required.

Various types of spectrophotometers have been already developed to individually meet each measurement method. One of the well known spectrophotometers is an apparatus having means for selecting a specific wavelength of light from light emitted from a light source with a monochromator, means for projecting light from the monochromator to an object for measurement, means for receiving light from the object with a photodetector, for example, a photomultiplier tube, means for amplifying an output signal from the photodetector, and means for recording the amplified data as a function of time. Another well known sepctrophotometer, commonly called a dual wavelength spectrophotometer, includes two monochromators, means for alternately measuring intensities of two light beams of different wavelengths, means for operating on both outputs of the alternative measurement, and means for recording the difference between the two absorbance measurements. What is called an automatic self-recording spectrophotometer for measuring absorption spectra of an object is well known, which includes means for automatically changing wavelengths of light from a monochromator by adding wavelength scanning means thereto, means for applying the outputs from a photodetector and an amplifier thereof to Y-axis of a X-Y recorder, and means for applying wavelength signals from the above wavelength scanning means to X-axis of the X-Y recorder, whereupon a spectrum is displayed on the X-Y recorder. A rapid scanning spectrophotometer is also well known which uses a rapid wavelength scanning technique and includes means for irradiating white light to an object and guiding the light from the object to a spectrometer, means for locating an image sensor; e.g., photo-diode-array on the axis of an exit slit of the spectrometer where the separated light is scattered and forms an image on the image sensor, means for selecting an output from each light receiving point of the image sensor by electrical rapid scanning to generate an output signal corresponding to each wavelength, and means for amplifying the output signal to apply the amplified output signal to a quick response display; e.g., a storage oscilloscope, so that a spectrum is displayed.

Each measurement system is individually designed in consideration of the kind of object to be examined or the desired information to be received therefrom and thus each of the above well known spectrophotometers is designed for a limited specific measurement and is not sufficient to handle a plurality of different types of measurements.

The present invention provides a spectrophotometer including means for collecting measured data of wide wavelength range at one time by utilizing a single optical system and means for modifying the collected data into a desired form for displaying it.

One of the objects of the present invention is to provide a spectrophotometer including means for displaying a change of absorption of organs as a function of time or absorption spectra of the organs.

Another object of the present invention is to provide a spectrophotometer capable of measuring a complex and heterogeneous system relating to a subsequent metabolic reaction which requires a very wide range of wavelength for abosorption data on measurement.

According to one embodiment of the present invention, there is provided a spectrophotometer including scanning means for irradiating light to an object which is measured by said apparatus, receiving light from the object, repeating a wavelength scan, and generating an analog signal corresponding to light intensity of the receiving light of each wavelength associated with the aforesaid wavelength scan, reading means associated with the scanning means for reading each wavelength during the aforesaid wavelength scan, A-D converting means for converting said analog signal to a digital signal, storage means for storing data which have been converted with said A-D converting means, setting means for setting instruction data for measurement, data selective-arithmetic means for reading out data stored in said storage means in accordance with said instruction data and for processing said read data with a predetermined arithmetic operation, and output means for displaying said processed data in a predetermined output mode.

The above and further objects and advantages of the present invention will more fully appear from the following detailed description when the same is read in connection with the accompanying drawings. It is to be expressly understood, however, that the drawing is for purpose of illustration only and is not intended as a definition of the limits of the invention.

DETAILED DESCRIPTION

Figure 1:
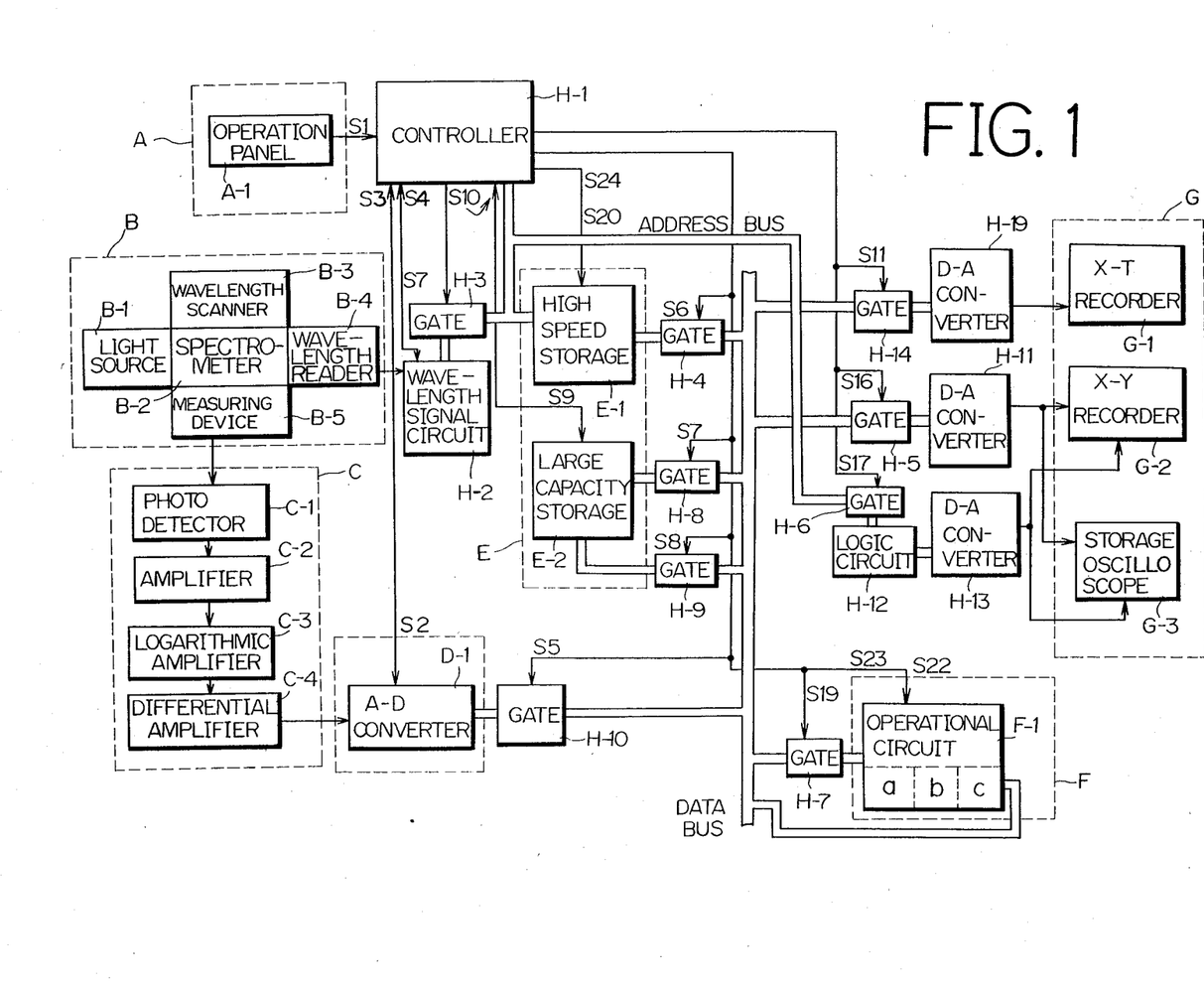
FIG. 1 is a block diagram illustrating an entire spectrophotometer according to the present invention.

In FIG. 1 there is shown a block diagram of a spectrophotometer of the present invention which comprises an operational unit A for entering desired data to operate the spectrophotometer, an optical unit B for accepting a measured object, an amplifying unit C for converting a photo signal detected in the unit B to an electronic analog signal, an A-D converting unit D for converting the converted analog signal to a digital signal, a storage unit E for storing the converted digital signal by the unit D corresponding to a wavelength, an operational circuit unit F for modifying the data stored in the unit E into a desired form, an output unit G for displaying the modified data by unit F, and a digital control unit consisting of elements H-1 to H-14 and H-19 for controlling data transfer within the spectrophotometer.

Each serial operation cycle corresponding to the operation of optical unit B in accordance with the present invention consists of three successive periods. The first period is a period during which measured digital signal data formed by by units B, C, and D about each wavelength scan cycle (hereinafter the measured digital signal data is called original data) are written into a high speed storage E-1 of unit E corresponding to each wavelength scanned during the scan cycle. The second period is a period during which the original data during one scan stored in the high speed storage in the first period are transferred and written into a large capacity storage E-2. The data stored in the storage E-1 are not erased during this second period. The large capacity storage E-2 is a fixed storage using magnetic tape. The third period is a period during which desired data are read out from the original data stored in the high speed storage E-1, the read data are operated on with or without a predetermined arithmetic operation, and the read and processed data (hereinafter being called processed data) are applied to the output unit G for display. One system operation cycle is completed by each operation of the aforesaid three successive periods, in accordance with one wavelength scan cycle completion of the spectrophotometer according to the present invention. The operation cycle is repeated at high speed.

The present spectrophotometer has a play-back mode and a real-time mode. The real-time mode is an operation mode on which the aforesaid operation cycle proceeds in parallel with actual measurement in the optical unit B. The play-back mode is another operation mode on which the original data stored in the storage E-2 are again read out after completing subsequent measurement, and are properly arranged or modified to generate desired processed data which are applied to the unit G.

Figure 2:
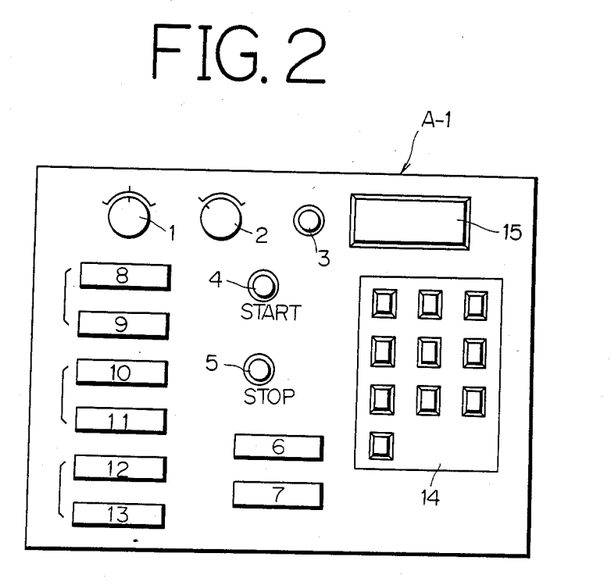
FIG. 2 is a front view of the operation panel according to the present invention.

Output mode selector 2 of the operation panel A-1 of unit A as shown in FIG. 2 is a switch for selecting the real time mode or the play-back mode. The play-back mode will be explained in detail at the end of this specification.

The optical unit B consists of a light source B-1 using a Xenon or Halogen lamp to provide light of high intensity and stability, a spectrophotometer B-2 using a diffraction grating of the Czerny-Turner type, a wavelength scanner B-3 which allows the spectrometor B-2 to generate a scanned wavelength light, a wavelength reader B-4 associated with the scanner B-3, and a measuring device B-5 for introducing the light exiting from the spectrometer B-2 to the measured object and for guiding the measured light from the object to the unit C.

Figure 3:
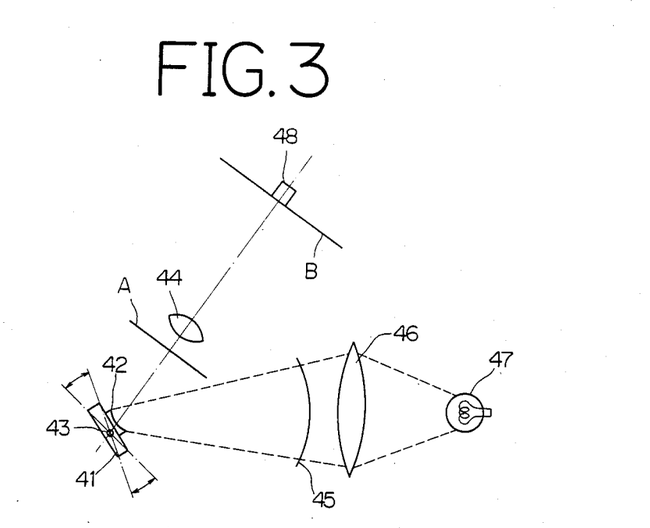
FIG. 3 is a schematic representation of a wavelength reader of the present invention.

As one embodiment of the present invention, the wavelength scanner B-3 and the wavelength reader B-4 are shown in FIG. 3.

Figure 4:
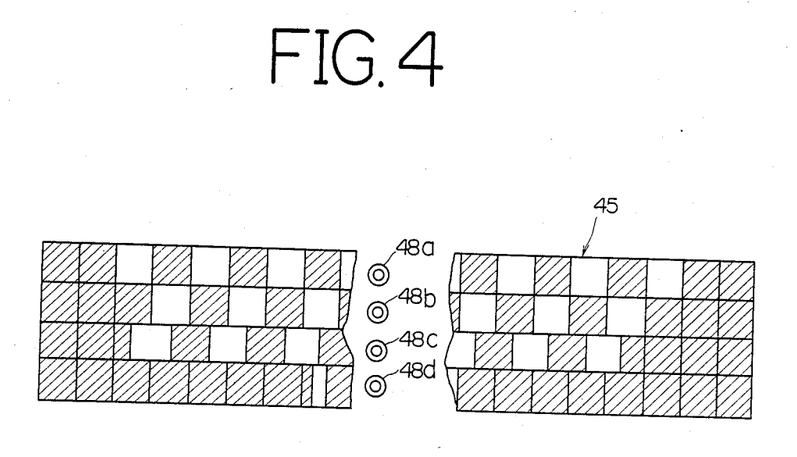
FIG. 4 is a pattern for use in reading a wavelength as one embodiment of the present invention.
Figure 5:
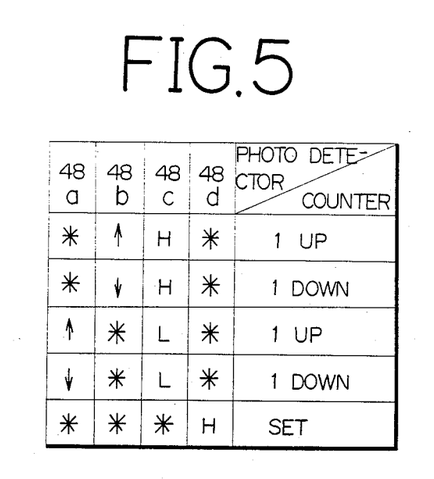
FIG. 5 is a signal table associated with the pattern as shown in FIG. 4.

The patterns as shown in FIG. 4 and FIG. 5 are associated with the wavelength reader to read a wavelength during a wavelength scan. The wavelength scanning in the present embodiment is carried out by utilizing a diffraction grating arranged in a Czerny-Turner manner. The diffraction grating 41 as shown in FIG. 3 composes a Czerny-Turner type spectrometer (spectroscope) with other optical parts (not shown). The grating 41 is fixed by a supporter which is supported by a torsion bar 43 so that the grating 41 and the bar 43 rotate about the axis of bar 43 as shown by arrow marks. The grating 41 vibrates according to a resonance frequency of the torsion bar by means of an electro-magnetic mechanism. Every groove on the diffraction surface of the grating 41 is parallel with the axis of the grating 41 and vibrates in association with the torsion bar, so that the wavelength of light emitted from the spectrometer B-2 varies within a predetermined wavelength range and repeats. The spectrometer B-2 may be a monochromator in the present invention.

On the back side of the grating 41, a concave mirror 42 is fixed thereto in parallel with the grating plane of the grating 41 as shown in FIG. 3. Light emitting from a light source 47 which is arranged for wavelength reading is focused through a focusing lens 46 and passes through a pattern plate 45 designed for wavelength reading. The pattern plate 45 is made of a thin stainless steel plate which is photoetched in accordance with a pattern as shown in FIG. 4, in which light is blocked within a part shown by oblique lines and not blocked within a part shown in white. Light passing through the pattern plate 45 is reflected on the concave mirror 42 and is focused on an image plane A shown in FIG. 3 to form a real image.

The real image on the image plane A is magnified by a lens 44 to form a magnified image of the pattern of the plate 45 on a plane B. Four photo detectors, e.g., photo transistors, 48a, 48b, 48c, and 48d are arranged on the plane B in a perpendicular direction of the drawing FIG. 3. Each of the four photo detectors 48a and 48d is positioned corresponding to each of four ranks of the pattern of the plate 45 as shown in FIG. 4 to generate an output signal which is an input signal applied to a up-down counter of a wavelength signal circuit H-2 in FIG. 1.

The concave mirror 42 which rotates-and-vibrates in accordance with the movements of the grating 41 allows the image of the pattern plate 45 being formed on the plane B to rotate-and-vibrate; i.e., the image of the pattern 45 relatively moves from side to side on the photo detectors 48a to 48d in FIG. 4. The movement of the image of the pattern 45 across detectors 48a to 48d changes a light intensity being applied to each photo detector of 48a to 48d for varying an output signal level thereof. In response to each output signal from the photo detectors 48a to 48d, the wavelength signal circuit H-2 allows the up-down counter to operate in accordance with the table as shown in FIG. 5. In FIG. 5 "↑" means a status that the output signal from the photo detectors varies from low level to high level, "↓" means a status that the output signal varies from high level to low level, "H" means a status that the output signal keeps a high level, "L" means a status that the output signal keeps a low level, and "*" means a status that the output signal may be any level; i.e., the level of the output signal does not affect the up-down counter. In accordance with the status of the output signal from the photodetectors 48a to 48d, the up-down counter counts up or counts down. The up-down counter counts up one by one every one pitch of the pattern 45 while the pattern 45 moves from right to left in FIG. 4, and counts down one by one every one pitch of the pattern 45 while the pattern 45 moves from left to right. In a status "SET" shown under the column "COUNTER" in FIG. 5, an output from the wavelength signal circuit H-2 is set an initial value of wave scanning.

Accordingly, the wavelength signal circuit H-2 generates a digital signal corresponding to each wavelength (called a wavelength signal hereinafter) while the grating 41 rotate-and-vibrates with wavelength scanning. In the present embodiment, a minimum bit of the wavelength signal corresponds to a wavelength variation of 1 nm, and the wavelength scanning range is within 350 nm and 700 nm.

Figure 6:
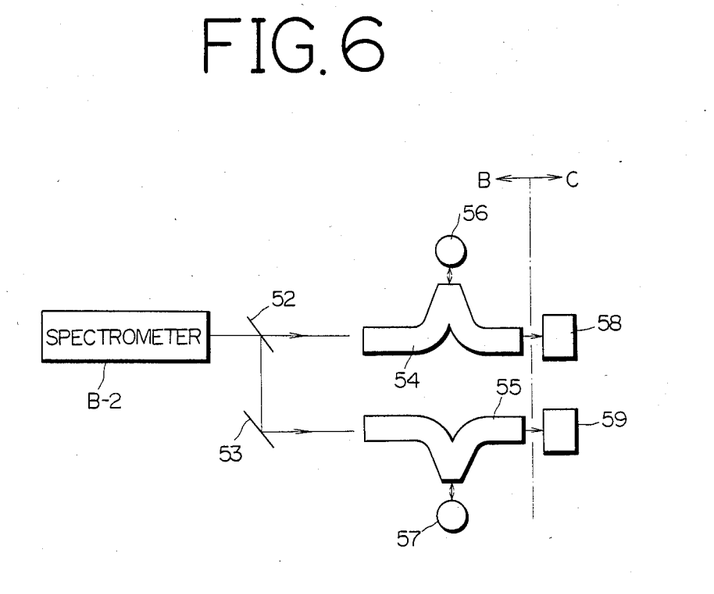
FIG. 6 is a schematic representation of an optical system of the present invention.

Referring to FIG. 6, there is shown a measuring device B-5 as one embodiment of the present invention. Light emitted from the spectrometer (or monochromator) B-2 is divided into two light beams by a beam splitter 52. One of the divided beams is applied to a measured object 56 through an optical fiber 54, and another beam is reflected on a mirror 53 to be applied to a reference sample 57 for the measured object 56 through an optical fiber 55. In the present embodiment, the measured object is a live organ or the like, and the reference sample 57 is a white scattered plate made of magnesium oxide or the like which is designed for composing double beams in complement with the beam applied to the measured object 56 and eliminating any influence caused by the fluctuation of the light source or others to adjust the double beams. Each beam via the object 56 or the sample 57 is condensed by the optical fiber 54 or 55 to be applied to each photo detector (photomultiplier tube or the like) 58 or 59 in an amplifying unit C, respectively.

A photo detector C-1 of the unit C in FIG. 1 represents the two photo detectors 58 and 59 corresponding to the double beams and generates two output signals. The two output signals from the photo detectors C-1 are amplified by an amplifier C-2, and are converted to logarithmic signals by a logarithmic amplifier C-3 to compute an absorption degree. Two output signals from the logarithmic amplifier C-3 are applied to a differential amplifier C-4 to generate an analog signal representing absorption degree of the measured object 56 in comparison with the reference sample 57. The analog signal generated from the differential amplifier C-4 is converted into a digital signal by the A-D converter D-1.

The process while the measured data generated from the A-D converter D-1 are written into the high speed storage E-1; i.e., the process in the aforesaid first period will be explained hereinafter.

In FIG. 2, a start switch 4 instructs the initation of a measurement and a stop switch 5 instructs the completion of the measurement. When the output mode selector 2 is set on the real time mode and the start switch 4 is turned on, the wavelength scanner B-3 will start and the grating of the spectrometer B-2 will rotate-and-vibrate to do wavelength scanning. The output signal from the wavelength reader B-4 representing a wavelength of the light exiting from the exit slit in the spectrometer B-2 determines an output signal of the wavelength signal circuit H-2. The wavelength signal generated from the circuit H-2 which is a 9-bit digital signal is introduced into a bus ADDRESS BUS through a gate H-3. Data on the bus are read into the controller H-1 in accordance with timing of an instruction signal for reading S4 from the wavelength signal circuit H-2.

Whenever the wavelength signal varies on every one bit; e.g., the wavelength from the spectrometer B-2 varies on every 1 nm, the controller H-1 sends an instruction signal for starting conversion S2 into the A-D converter D-1. In accordance with the instruction signal S2, the converter D-1 converts at high speed and generates a conversion completion signal S3 to be applied to the controller H-1. In response to the signal S3, the controller H-1 generates a signal S5 for allowing a gate H-10 to open wherein the measured data converted into digital data are applied to bus DATA BUS, and generates a signal S6 for allowing a gate H-4 to open and a writing instruction signal S24 which is at the same time sent to the high speed storage E-1 to write the measured data from the converter D-1 therein. Addressing during this writing in the storage E-1 is based on the wavelength signal entered into the controller H-1 from the wavelength signal circuit H-2. Therefore, the measured data are stored in the storage E-1 at an address corresponding to a wavelength of which light is measured in the spectrometer B-2. The high speed storage is a random access memory which is capable for storing 16 scan cycles; i.e., data measured by 16 wavelength scanning operations, wherein the measured data about a wavelength consists of 12 bits and the address consists of 13 bits. The controller H-1 provides the storage E-1 with 13-bit address information while the controller H-1 receives a wavelength scan count signal S7 from the circuit H-2 and provides a bit signal for accumulating the 9-bit wavelength signal generated from circuit H-2. The data stored in the storage E-1 are lodged during 16 scan cycles in the storage E-1.

Figure 7:
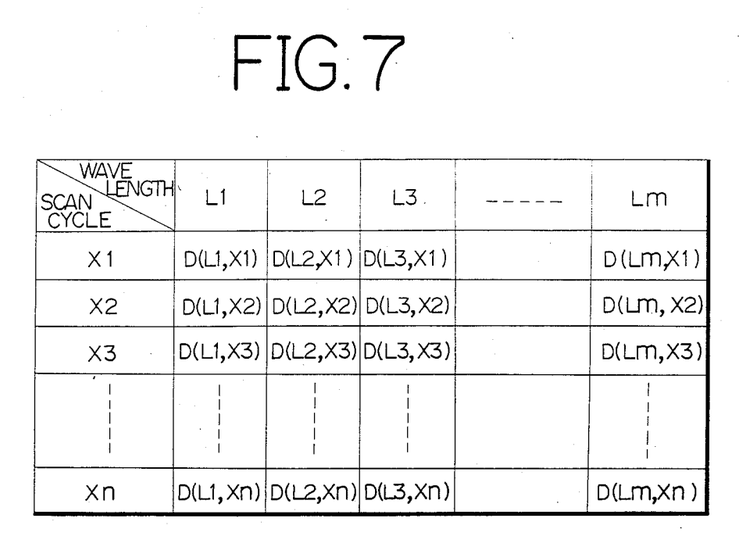
FIG. 7 is a data table stored in the storage means of the present invention.

Accordingly, the original data subsequently obtained by each wavelength scanning on repeat are stored in the storage E-1 every scan cycle of X1 through Xn associated with each wavelength of L1 through Lm in blocks as shown in FIG. 7.

After data obtained by one time wavelength scanning are written into the storage E-1, an operation of the present spectrophotometer proceeds to the second period; i.e., data stored in the storage E-1 during one scan are transferred into the large capacity storage E-2. The controller H-1 which receives a wavelength scan count signal from circuit H-2 and detects completion of one time wavelength scanning opens the gate H-4 by signal S6 and the gate H-9 by signal S8. The controller H-1 further sends a transfer start instruction signal S9 to the storage E-2 and an address instruction at the same time to the bus ADDRESS BUS so that data stored in the storage E-1 are transferred into the storage E-2 via the bus DATA BUS. The storage E-2 also stores a label corresponding to each scan cycle number when the transferred data are obtained. The label number is displayed in numerals of four digits on a display 15 in FIG. 2. After completion of transferring the data during one scan into the storage E-2, the storage E-2 generates a transfer completion signal S10 which is applied to the controller H-1, the operation of the present device then proceeds to the third period.

In the third period the processed data selected from the original data stored in the storage E-1 are operated on and transferred to the output unit G. Prior to this third period, however, how to select and operate the original data to obtain a desired processed data (hereinafter called measure mode) must be set by the operation panel A-1.

The measure mode in accordance with the present invention will be described in detail hereinafter.

The measure mode is divided into three modes X, Y, and Z and is selected by a measure mode selector 1 provided on the panel A-1 shown in FIG. 2.

X mode: The X mode is selected for observing a time change in the degree of absorption about a specific wavelength. Each wavelength scan provides the original data corresponding to every 1 nm wavelength from L1 to Lm. The X mode selects only the data selected about the specific wavelength from each scan, and applies the selected data to the unit G for displaying its time change. The selection for the specific wavelength is set by wavelength setting switches 8 to 13 in FIG. 2. These six switches 8 to 13 are digital switches each of which sets a wavelength. The data corresponding to each of six wavelengths set by these six switches 8 to 13 may be displayed on the X-T recorder G-1 which is a multiple pen type recorder.

An operation of the X mode will be described hereinafter. Operation data selected by the panel A-1 switches are transferred into the controller H-1 by signal S1. After completion of the first and second periods as above described, the controller H-1 provides the bus ADDRESS BUS with address information of the wavelengths set by the wavelength setting switches 8 to 13. The controller H-1 at the same time generates the signal S6 for allowing the gate H-4 to open and sends a read instruction signal S20 to the storage E-1 for providing the bus DATA BUS with data corresponding to an address appointed in the storage E-1. The controller H-1 further opens a gate H-14 by a signal S11 for allowing the data in the bus DATA BUS to be applied to a D-A converter H-19 which converts the data into analog signals to be displayed in the recorder G-1. In the present embodiment, the converter H-19 has six different D-A converters corresponding to the six different wavelengths which can be set. Therefore, in the third period, the aforesaid output cycle is repeated six times, and the time changing absorption degree data are recorded about six different wavelengths by changing the time of the recorder G-1 in this X mode.

Y mode: This mode is selected for displaying wavelength scan data about one scan cycle as a function of absorption degree for each wavelength on the unit G. This mode does not need the aforesaid wavelength setting.

An operation of the Y mode will be explained hereinafter. In the third period after completion of the first period and the second period, the controller H-1 provides the bus ADDRESS BUS with address information corresponding to a store address for data of the first wavelength L1 in the wavelength scan range, opens the gate H-4 by the signal S6, and sends the read instruction signal S20 to the storage E-1 for providing the bus DATA BUS with the instructed data in the storage E-1. The controller H-1 subsequently opens the gates H-5 and H-6 by signals S16 and S17. The absorption degree data on the bus DATA BUS are converted into an analog signal by the D-A converter H-11, and the converted analog signal is applied to a storage oscilloscope G-3 as an input signal on the Y axis. The data on the bus ADDRESS BUS are modified into a proper numerical value by the logic circuit H-12 which comprises a subtraction circuit and the numerical value generated from the circuit H-12 is applied to a D-A converter H-13. An analog output signal from the converter H-13 is applied to a X axis of the storage oscilloscope G-3 for driving the horizontal axis thereof.

After the aforesaid operation, the controller H-1 advances 1 bit of the address information and repeats the aforesaid operation. Until the operation reaches the last wavelength Lm of the scan range for each 1 nm, absorption degree data for each wavelength are applied to the Y axis of the oscilloscope G-3 every 1 nm wavelength for displaying a wavelength spectrum thereon.

Z mode: This mode is a dual wavelength measure mode in which the difference between two selected wavelength's absorption degrees is recorded as a function of time. In this mode, two wavelengths are selected by the wavelength setting switches 8 to 13 of the panel for obtaining a difference between absorption degrees of the two wavelengths. In this embodiment, three pairs of two wavelengths may be set; i.e., switches 8 and 9, switches 10 and 11, switches 12 and 13. When wavelength La is set by switch 8 and wavelength Lb is set by switch 9, an absorption degree difference between the two wavelengths D(La)-D(Lb) is obtained.

An operation of this Z mode will be explained hereinafter. In the third period after the first and second periods, the controller H-1 provides the bus ADDRESS BUS with address information corresponding to the wavelength set by the switch 8, opens the gate H-4 by the signal S6, and sends the read out instruction signal S20 to the storage E-1 to provide the bus DATA BUS with the data of the selected wavelength. The controller H-1 further opens the gate H-7 by a signal S19, and sends a read-in instruction signal S22 to the operation circuit F-1 for storing data on the bus DATA BUS in a register of the circuit F-1. After this operation, the controller H-1 provides the bus ADDRESS BUS with address information corresponding to the wavelength set by the switch 9, opens the gate H-4 by the signal S6, and sends the read out instruction signal S20 to the storage E-1 to provide the bus DATA BUS with the wavelength data instructed in the register E-1. The controller further opens the gate H-7 by the signal S19 and sends the read-in instruction signal S22 to the circuit F-1 for storing data on the bus DATA BUS in a register of the circuit F-1.

The operational circuit F-1 includes a temporary storage register (a), an arithmetic logic circuit (b) consisting of an adder, subtractor, and divider, and a buffer gate (c). The two data about the two wavelengths which are stored in the register (a) by the aforesaid operation are subtracted by the subtractor of the arithmetic logic circuit (b), and the result (difference data) are temporarily stored in the buffer gate (c). Just after this storage, the controller H-1 sends a signal S23 to the circuit F-1 for transferring the data in the buffer gate (c)

to the bus DATA BUS, and opens the gate H-14 by the signal S11 to apply the data to the D-A converter H-19. An analog signal converted by the converter H-19 is applied to the recorder G-1.

Since the present embodiment is capable of displaying three pairs of absorption difference of two wavelengths, the controller H-1 processes the same operation above about a pair of wavelengths set by the switches 10 and 11, and results from the operational circuit F-1 are supplied to the recorder G-1. The controller H-1 likewise processes a pair of wavelengths set by switches 12 and 13. Accordingly, absorption degree differences about three pairs of wavelengths are displayed in accordance with elapsed time by time shifting the recorder G-1.

The above description about each operation of the three modes X, Y, and Z is for real time operation when the output mode selector 2 is set to be the real time mode and the time average preset switch 6 is set to a "1".

The time average preset switch 6 will be explained in detail hereinafter. The present embodiment provides for a time average operation in which data obtained in subsequent wavelength scannings are adds-and-averaged over a plurality of scanning and the average is processed to generate the desired data according to each mode X, Y, or Z. The number of data samples over which the average is preset by the switch 6. When the switch 6 is preset to be "2" or more, the average operation is performed, and an operation in the third period will be different from that described earlier.

X' mode: An operation when an average operation is processed in the X mode will be described. The time average is set by the switch 6 to be "3" herein, meaning an average of a wavelength measurement is to be taken over three wavelength scannings. In the X mode, the data of wavelengths selected by the switches 8 to 13 are read out from data for each scan cycle stored in the storage E-1, and the read out data are applied to the recorder G-1. In the third period on the average operation, however, data about a wavelength (La) selected by a wavelength setting switch are subsequently read out from the data stored in the register E-1 during three scan cycles, namely, the current scan cycle and its preceding two scan cycles, and the read out data are applied to the bus DATA BUS under control of the controller H-1. The data which are applied to the bus DATA BUS are subsequently read into the register (a) of the circuit F-1 through the gate H-7. Assuming that the data read into the circuit F-1 for three scan cycles are $(DL_a, X_{b-2})$, $D(L_a, X_{b-1})$, $D(L_a, X_b)$, the added-and-averaged data by the operational circuit F-1 will be operated on as follows:

$$D' = [D(L_a, X_{b-2}) + D(L_a, X_{b-1}) + D(L_a, X_b)]/3$$

The result of the operation is introduced to the bus DATA BUS from the circuit F-1 under control by the controller H-1, and is supplied to the D-A converter H-19. An output signal converted by the converter H-19 is applied to the recorder G-1. Data about a selected wavelength for every three scan cycles are added and averaged, and on the basis of the averaged data the recorder displays an absorption degree according to elapsed time. The present time average presetting switch 6 is capable for presetting up to "16" scanning cycles over which an average can be taken.

Y' mode: An operation when the average operation is processed on the Y mode will be explained. As described in the Y mode, address information corresponding to a wavelength on the bus ADDRESS BUS is applied to the X axis of the storage oscillioscope G-3 via the gate H-6, circuit H-12, and converter H-13, and the measured data on the bus DATA BUS about the aforesaid wavelength are applied to the Y axis of the recorder via the gate H-5 and converter H-11. The data applied to the Y axis of the oscillo scope G-3 are the added-and-averaged data of measured data for each wavelength during plural scan cycles preset by the presetting switch 6. The control operation for this will be apparent from the description about the X' mode. That is, data about a specific wavelength during selected plural scan cycles are read out from the register E-1 to the bus DATA BUS and are stored in the circuit F-1, while the gate H-5 is closed. The circuit F-1 operates on the stored data which are added and averaged, and the operated data are again applied to the bus DATA BUS. The data applied to the bus DATA BUS are applied to the Y axis of the oscillioscope G-3 through the gate H-5 which is opened by the signal S16.

Z' mode: An operation when the average operation is processed on the Z mode will be explained. In the Z mode, data of dual wavelengths selected by a pair of wavelength setting switches are read out from the storage E-1 to the circuit F-1 subsequently, and the circuit F-1 operates to determine a difference in absorption degrees. In the Z' mode, when data about one of a pair of wavelengths are transferred from the storage E-1 to the circuit F-1, data for a plural of the scan cycles which are preset by the switch 6 are transferred. The transferred data into the circuit F-1 are added and averaged and temporarily stored in the circuit F-1.

Data about another wavelength are processed likewise. Data for a plural scan cycles selected by the time average presetting switch are transferred into the circuit F-1 for being added and averaged therein. A difference between each average data of the two wavelengths is determined in the circuit F-1 and applied to the recorder G-1.

Finally, the aforesaid play-back mode will be explained hereinafter. In the play-back mode, a selected portion of data stored in the storage E-2 is played back, and data for each scan cycle (i.e., data within one block) are written into the storage E-1 subsequently, while the third period operation is processed to generate processed data which are arranged and modified in a proper manner.

A ten-key keyboard 14 of the panel A-1 selects an initial block of data which are read out from the stoeage E-2. As above described, data within each block stored in the storage E-2 are labeled, and the initial block is selected by the entering the label number of the initial block in decade on keyboard 14 and upon depression of a data input switch 3. When the start switch 4 is depressed, the controller H-1 sends a signal to the storage E-2, and searches for the selected initial block. When the initial block is found, data in the initial block are transferred to the storage E-1 through the gates H-8 and H-4, and an operation in the third period is processed. the operation of transferring subsequent block's of data from the storage E-2 to the storaage E-1 and the output operation in the third period is repeated until the stop switch 5 is depressed.

The output operation in the third period may be processed in any of modes X, Y, Z, X', Y', and Z'. In the Y or Y' mode which displays a wavelength spectrum or spectra, the X-Y recorder G-2 may be used associated with the storage oscilloscope G-3 in the light of playback time or response speed. An interval output setting switch 7 in FIG. 2 is used on the play-back mode as an option. The above description about the play-back mode is based on the status that the setting switch 7 is set to a "1" condition, where an output operation in the third period on a selected mode is carried out whenever original data for one scan cycle are read out from the storage E-2. When the switch 7 is set to a "2" or more numeral "N" condition, an operation in the third period is carried out only one time whenever original data for N scan cycles are read out. That is, original data are sampled out in the interval of N scan cycles, and processed data based on the original data for one scan cycle are displayed on the unit G though output operation in the third period is not carried out while original data not being sampled are read out. This allows the unit G to display the time elapsed data on a very long time scale.

In the present embodiment, the wavelength scanning in the optical unit B is performed by mechanically rotating and vibrating the diffraction grating 41, which should not limit the scope of the present invention. The wavelength scanning may be performed by other constructions in which white light is applied to the measured object, light obtained from the object is processed by a spectrometer, an image sensor or sensors are arranged on an exit plane of the spectrometer, an output signal from the image sensor(s) is electronically scanned, which does not need the technique for reading a wavelength as illustrated in FIGS. 3 to 5. The operation of arranging or modifying the original data in the present embodiment should not limit the scope of the present invention. Other operations may be available, such as forming a difference between a wavelength spectrum in a scan cycle and a wavelength spectrum in another scan cycle, which can be computed and displayed on the unit G, or other various operations or control functions can be performed.

The present spectrophotometer, which measures and stores measured data within a wide wavelength range at one time by utilizing a single optical system, arranges-and-modifies the measured data for display, carries out each measuring mode by merely switching its selector in the present spectrophotometer, such as a mode for displaying an absorption degree's change according to elapsed time, wavelength spectra, elapsed absorption degree difference between two specific wavelengths, or others. Namely, the present invention provides for measured data which are arranged and modified in various modes at one measuring device, and does not need to repeat similar measurements for the object of the present invention as in prior techniques, so that the present invention is particularly useful for observing metabolism reaction of organs. The absorption degree used herein above in this specification may be used as a technical term "absorbance".

What is claimed is:

1. A spectrophotometer comprising:
   photometric means for irradiating light to an object which is measured by said spectrophotometer, receiving light from said object, repeatedly scanning through a plurality of predetermined wavelongths of said light, and generating an analog signal representing an intensity of received light for each wavelength associated with each said wavelength scan;
   reading means associated with said photometric means for reading each wavelength scanned during each repeated wavelength scan;
   A-D converting means for converting each said analog signal to a digital signal;
   storage means for storing digital data produced by said A-D converter in time order for each wavelength in each wavelength scan over a number of repetitive wavelength scans;
   setting means for setting instruction data for measurement;
   data selective-arithmetic means for reading out data stored in said storage means in accordance with said instruction data and for processing said read data with a predetermined operation determined by said instruction data;
   output means for displaying said processed data in a predetermined output mode; and
   output mode selecting means for selecting said predetermined output as one of a real-time mode and a play-back mode;
   said storage means comprising a high speed storage for temporarily storing converted data corresponding to each wavelength as said wavelength scan is repeated a predetermined number of times, said converted data being successively generated from said A-D converting means, and
   a large capacity storage for storing every converted data corresponding to each said wavelength scan, said selectivearithmetic means reading out desired data from said high speed storage in parallel with the scanning operation of said photometric means to process said read data with said predetermined operation in accordance with said instruction data when said real-time mode is set and reading out data from said large capacity storage in accordance with said instruction data to process said read data with a predetermined operation when said play-back mode is set.

2. A spectrophotometer according to claim 1, wherein said instruction data are set by said setting means so that said selective-arithmetic means reads out said stored data corresponding to a predetermined wavelength and said output means displays said read out data.

3. A spectrophotometer according to claim 1, wherein said instruction data are set by said setting means so that said selective-arithmetic means reads out stored data corresponding to every wavelength to apply said read data to said output means and said output means displays a desired spectrum.

4. A spectrophotometer according to claim 1, wherein said instruction data are set by said setting means so that said selective-arithmetic means reads out said stored data corresponding to two predetermined wavelengths and forms a difference between said read out data and said output means displays said difference.

5. A spectrophotometer according to claim 1, wherein said storage means stores data by each wavelength scan corresponding to each wavelength within a scan range, said data being successively generated from said A-D converter, said setting means further includes an averaging presetting switch for setting an averaging operation and the number of data samples to be averaged, and said selective-arithmetic means reads out data stored in said storage means by wavelength scans corresponding to the number of data samples to be averaged to process said read data with an averaging arithmetic operation about each wavelength.

6. A spectrophotometer according to claim 1, further comprising interval setting means for setting instruction data for reading out data stored in said storage means corresponding to a predetermined number of scan cycles, and said selective-arithmetic means samples data from said storage means in accordance with said instruction data set in said interval setting means.

7. A spectrophotometer according to claim 1, wherein said photometric means includes an optical beam source, a first optical fiber path for guiding an optical beam produced by said source to an object to be measured and guiding a reflected optical beam from said measured object, and means for generating an analog signal coupled to receive said reflected optical beam from said first optical fiber path.

8. A spectrophotometer according to claim 7, wherein said photometric means further includes a second optical fiber path for guiding an optical beam produced by said source to a reference object and for guiding a reflected optical beam from said reference object, and said means for generating an analog signal is coupled to also receive said reflected optical beam from said second optical fiber path.

9. A spectrophotometer comprising:
photometric means for irradiating light to an object which is measured by said spectrophotometer, receiving light from said object, repeatedly scanning through a plurality of predetermined wavelengths of said light, and generating an analog signal representing an intensity of received light for each wavelength associated with each said wavelength scan;
reading means associated with said photometric means for reading each wavelength scanned during each repeated wavelength scan;
A-D converting means for converting each said read analog signal to a digital signal;
storage means for storing digital data produced by said A-D converter in time order for each wavelength in each wavelength scan over a number of repetitive wavelength scans, said storage means having a high speed storage for temporarily storing data successively derived from said A-D converting means for each scan during repetitive wavelength scans and a large capacity storage for storing every data measured during every scan, data derived from said A-D converting means by one wavelength scan being stored in said high speed storage, said stored data during a predetermined number of wavelength scan cycles being transferred from said high speed storage to said large capacity storage;
setting means for setting instruction data for measurement;
data selective-arithmatic means for reading out data stored in said storage means in accordance with said instruction data and for processing said read data with a predetermined operation determined by said instruction data; and
output means for displaying said processed data in a predetermined output mode.

10. A spectrophotometer according to claim 9, wherein said instruction data are set by said setting means so that said selective-arithmetic means reads out said stored data corresponding to a predetermined wavelength and said output means displays said read out data.

11. A spectrophotometer according to claim 9, wherein said instruction data are set by said setting means so that said selective-arithmetic means reads out stored data corresponding to every wavelength to apply said read data to said output means and said output means displays a desired spectrum.

12. A spectrophotometer according to claim 9, wherein said instruction data are set by said setting means so that said selective-arithmetic means reads out said stored data corresponding to two predetermined wavelengths and forms a difference between said read out data and said output means displays said difference.

13. A spectrophotometer according to claim 9, wherein said storage means stores data by each wavelength scan corresponding to each wavelength within a scan range, said data being successively generated from said A-D converter, said setting means further includes an averaging presetting switch for setting an averaging operation and the number of data samples to be averaged, and said selective-arithmetic means reads out data stored in said storage means by wavelength scans corresponding to the number of data samples to be averaged to process said read data with an averaging arithmetic operation about each wavelength.

14. A spectrophotometer according to claim 9, wherein said photometric means includes an optical beam source, a first optical fiber path for guiding an optical beam produced by said source to an object to be measured and guiding a reflected optical beam from said measured object, and means for generating an analog signal coupled to receive said reflected optical beam from said first optical fiber path.

15. A spectrophotometer according to claim 14, wherein said photometric means further includes a second optical fiber path for guiding an optical beam produced by said source to a reference object and for guiding a reflected optical beam from said reference object, and said means for generating an analog signal is coupled to also receive said reflected optical beam from said second optical fiber path.

16. A spectrophotometer comprising:
photometric means for irradiating light to an object which is measured by said spectrophotometer, receiving light from said object, repeatedly scanning through a plurality of predetermined wavelengths of said light, and generating an analog signal representing an intensity of received light for each wavelength associated with each said wavelength scan;
reading means associated with said photometric means for reading each wavelength scanned during each repeated wavelength scan;
A-D converting means for converting each said read analog signal to a digital signal;
storage means for storing digital data produced by said A-D converter in time order for each wavelength in each wavelength scan over a number of repetitive wavelength scans;
setting means for setting instruction data for measurement;
data selective-arithmetic means for reading out data stored in said storage means in accordance with said instruction data and for processing said read data with a predetermined operation determined by said instruction data;

output means for displaying said processed data in a predetermined output mode; and a diffraction grating;

wherein said reading means includes a light source, a slit having a two-dimensional predetermined pattern, a reflector positioned on a rotating axis of said diffraction grating, said reflector being fixed with said grating and said slit being positioned between said light source and said reflector, and a plurality of photodetectors which are located on an image formation plane of said predetermined pattern of said slit formed by reflected light from said reflector, said photodetectors generating a digital output signal representing each wavelength corresponding to an angle of rotation of said grating during said wavelength scan.

17. A spectrophotometer according to claim 16, wherein said instruction data are set by said setting means so that said selective-arithmetic means reads out said stored data corresponding to a predetermined wavelength and said output means displays said read out data.

18. A spectrophotometer according to claim 16, wherein said instruction data are set by said setting means so that said selective-arithmetic means reads out stored data corresponding to every wavelength to apply said read data to said output means and said output means displays a desired spectrum.

19. A spectrophotometer according to claim 16, wherein said instruction data are set by said setting means so that said selective-arithmetic means reads out said stored data corresponding to two predetermined wavelengths and forms a difference between said read out data and said output means displays said difference.

20. A spectrophotometer according to claim 16, wherein said storage means stores data by each wavelength scan corresponding to each wavelength within a scan range, said data being successively generated from said A-D converter, said setting means further includes an averaging presetting switch for setting an averaging operation and the number of data samples to be averaged, and said selective-arithmetic means reads out data stored in said storage means by wavelength scans corresponding to the number of data samples to be averaged to process said read data with an averaging arithmetic operation about each wavelength.

21. A spectrophotometer according to claim 16, further comprising interval setting means for setting instruction data for reading out data stored in said storage means corresponding to a predetermined number of scan cycles, and said selective-arithmetic means samples data from said storage means in accordance with said instruction data set in said interval setting means.

22. A spectrophotometer as in claim 16, wherein said photometric means includes an optical beam source, a first optical fiber path for guiding an optical beam produced by said source to an object to be measured and guiding a reflected optical beam from said measured object, and means for generating an analog signal coupled to receive said reflected optical beam from said first optical fiber path.

23. A spectrophotometer as in claim 22, wherein said photometric means further includes a second optical fiber path for guiding an optical beam produced by said source to a reference object and for guiding a reflected optical beam from said reference object, and said means for generating an analog signal is coupled to also receive said reflected optical beam from said second optical fiber path.

* * * * *